Oct. 6, 1931.  G. REMNSNIDER  1,825,755

FLUID PRESSURE REGULATOR

Filed Dec. 24, 1928

Inventor
G. Remnsnider
By E. E. Huffman
Att'y.

Patented Oct. 6, 1931

1,825,755

UNITED STATES PATENT OFFICE

GEORGE REMNSNIDER, OF BELLEVILLE, ILLINOIS

FLUID PRESSURE REGULATOR

Application filed December 24, 1928. Serial No. 328,122.

My invention relates to a fluid pressure regulator and, while it may be used for other purposes, it is particularly adapted for use in connection with what are known as drinking faucets or bubble fountains.

One object of my invention is to produce a device of the class referred to which will be simple of construction and have a minimum number of parts.

Another object of my invention is to so construct the device that it will maintain a uniform height of flow throughout a wide range of pressure variation in the supply system.

Still another object of my invention is to avoid the use of packing while at the same time securing a substantially water-tight valve structure.

Figure 1:
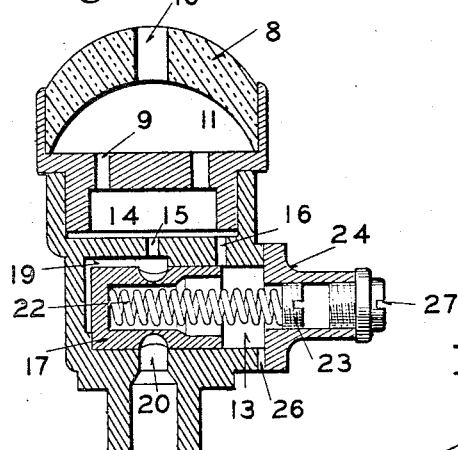
Figure 2:
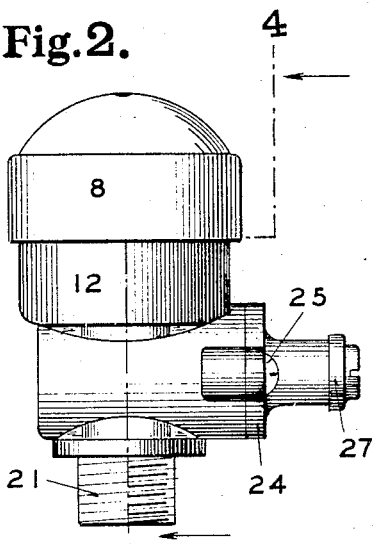
Figures 3, 4:
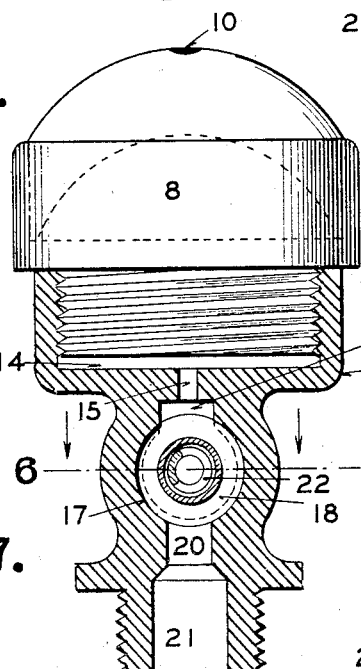
Figure 5:
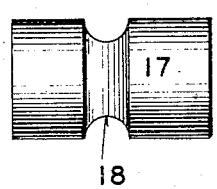
Figure 6:
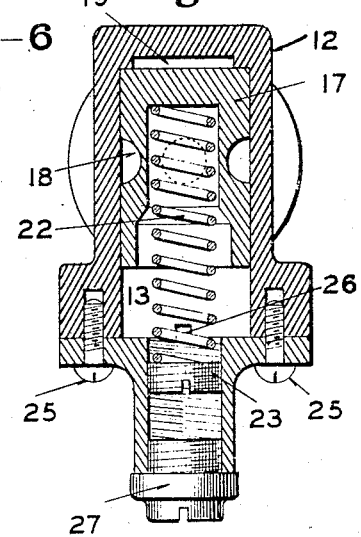
Figure 7:
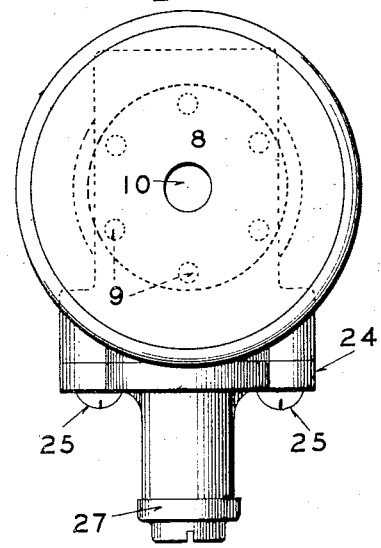

In the accompanying drawings, which illustrate one form of my device applied to a bubble fountain, Figure 1 is a vertical section taken on the line 1—1 of Figure 3; Figure 2 is a side elevation; Figure 3 is an elevation taken at right angles to Figure 1; Figure 4 is an enlarged view partly in elevation and partly in section on the line 4—4 of Figure 2; Figure 5 is a detail view of the piston; Figure 6 is a section taken on the line 6—6 of Figure 4; and Figure 7 is a top plan view.

The numeral 8 indicates a bubble fountain cap similar to that shown and disclosed in United States Patent Number 1,278,403 granted to E. E. Wangelin, September 10, 1918, except that it is not provided with the relief openings therein described as such openings are neither necessary or desirable when the cap is used in combination with my valve mechanism. This cap is provided with the usual jet openings 9, outlet 10 and an intermediate chamber 11 and is threaded into the upper part of a valve casing 12.

Formed in the valve casing is a horizontal cylindrical bore 13 communicating with a chamber 14 below the jets 9 through a secondary supply passage 15 and a drain opening 16. Sliding in the bore 13 is a piston 17 forming the valve of the device. This piston valve has formed in its periphery an annular groove 18 semi-circular in cross section. When the piston is in its rear position, as shown in Figure 1, the groove 18 communicates with the secondary supply passage 15 and through a cored-out port 19 with the rear face of the piston. In this position it is also in register with a main supply passage 20 connected through a hollow threaded stem 21 with the supply pipe (not shown) of the water system to which it is applied.

The diameter of the main supply passage 20 is the same as the diameter of the semi-circular groove 18 so that the combined area of the two branches of the passage formed around the piston by said groove is equal to the area of the supply passage which, however, is greater than the area of the secondary supply passage 15. Owing to this construction, when water is supplied to the device, more or less pressure is developed in the port 19 and communicated to the rear face of the piston. This will tend to move the piston toward the right hand side (Figure 1) and thus reduce the effective area of the supply passage 20. This movement is opposed by a coil spring 22 seated at one end in a bore in the piston and bearing at the other end against an adjustable screw plug threaded into a bore in a cover plate 24. Screws 25 secure the cover plate over the open end of the bore 13 completely closing the same except for a drain opening 26 formed by a notch in the casing, as shown in Figures 1 and 6. The outer end of the bore in the cap is preferably closed by a threaded cap plug 27 to prevent unauthorized tampering with the adjustable plug 23.

The operation of my device is as follows: When water is admitted through the supply passage 20 pressure will be developed in the port 19 and acting on the end of the piston valve will move the valve to reduce the supply until the pressure is balanced by the resistance of the spring 22. The tension of this spring may be varied by rotating the adjusting plug 23 until the desired rise of the stream of water above the outlet 10 is obtained. After the proper spring adjustment has been made the height of the water stream will remain practically unvaried throughout the entire range of pressure variation which may occur in the supply system. Owing to the fact that the area of the groove 18 is equal to that of the supply passage 20 not only is the pressure around the piston valve balanced but reduction of pressure is secured upon the initial movement of the valve and consequently there are no spurts of the water stream resulting either from binding of the valve or failure to function during the first part of the movement. The lack of binding and friction also prevents wear on the piston so that it remains water-tight without the use of packing. When the supply is cut off the piston will return to the position shown in Figure 1 uncovering the drain opening 16 so that water contained in the cap 8 may drain into the forward end of the bore 13 and thence through the drain opening 26.

Having fully described my invention, what I claim as new and desire to secure by Letters Patent of the United States is:

1. In a device of the class described, the combination with a valve casing provided with an inlet passage, said casing being provided with a cylindrical bore intersection the inlet passage, a discharge passage of less area than the inlet passage leading from the side of the bore opposite the inlet passage to an outlet, a piston in said bore provided with a peripheral groove, a spring normally holding said piston in position to connect the passages by means of said groove, and a port leading from a point adjacent said discharge passage and extending between the periphery of the piston and the wall of the bore, said port supplying pressure at one end of the piston to move it against said spring to regulate the flow of water between the passages.

2. In a device of the class described, the combination with a valve casing provided with an inlet passage, said casing being provided with a cylindrical bore intersecting the inlet passage, a discharge passage of less area than the inlet passage leading from the side of the bore opposite the inlet passage to an outlet, a piston in said bore provided with a peripheral groove of substantially semi-circular cross-section, the cross sectional area of said groove being approximately one-half that of the inlet passage, a spring normally holding said piston in position to connect the passages by means of said groove, and a port leading from a point adjacent said discharge passage and extending between the periphery of the piston and the wall of the bore, said port supplying pressure at one end of the piston to move it against the spring to regulate the flow of water between the passages.

In testimony whereof, I hereunto affix my signature, this 21st day of December, 1928.

GEORGE REMNSNIDER.